UNITED STATES PATENT OFFICE.

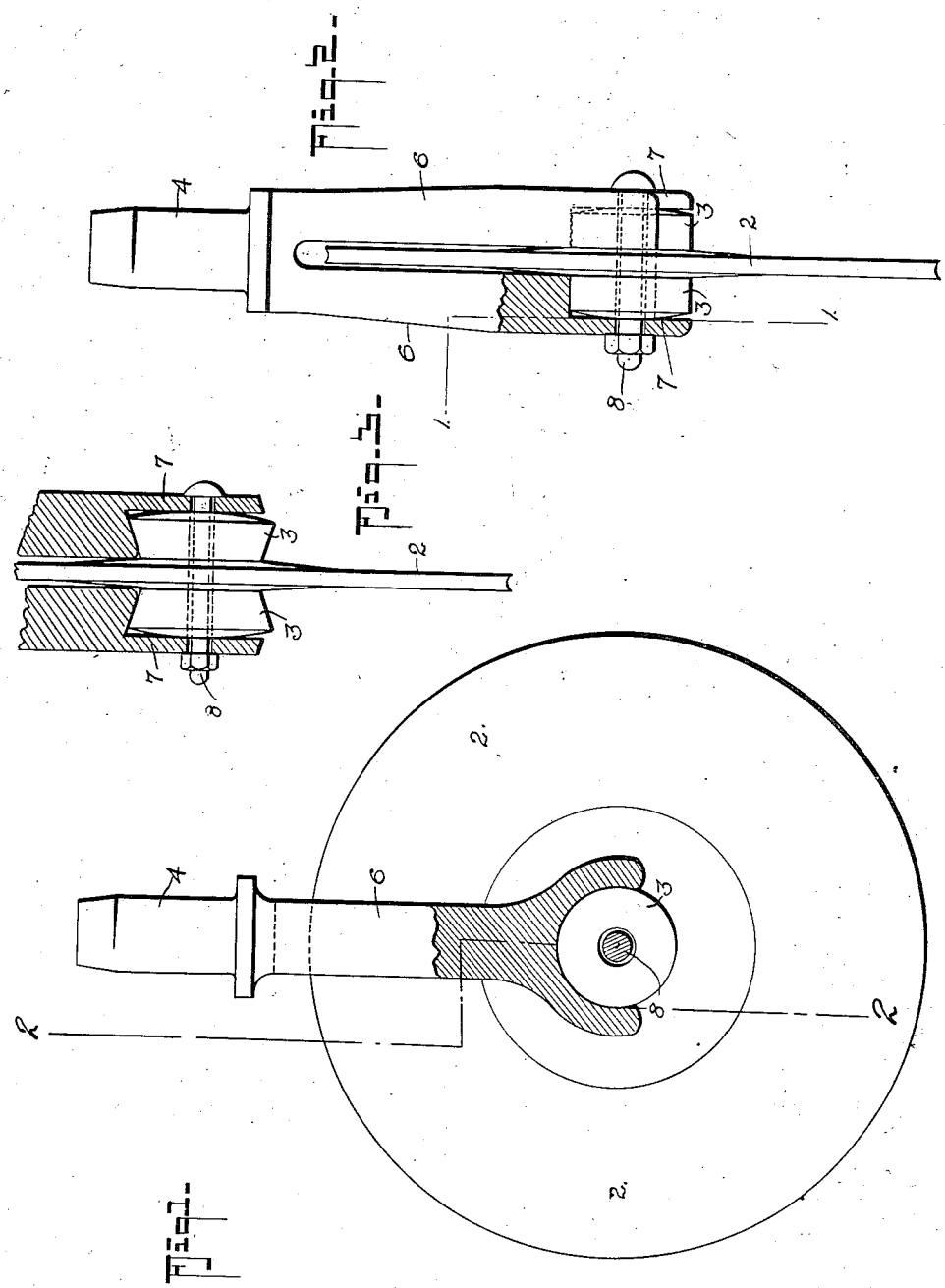

GUSTAVE O. SWANSON, OF VANCOUVER, BRITISH COLUMBIA, CANADA.

CALKING-TOOL.

1,298,121.  Specification of Letters Patent.  Patented Mar. 25, 1919.

Application filed October 21, 1918. Serial No. 258,949.

*To all whom it may concern:*

Be it known that I, GUSTAVE O. SWANSON, a subject of the King of Sweden, residing at Vancouver, in the Province of British Columbia, Canada, have invented certain new and useful Improvements in Calking-Tools, of which the following is a specification.

This invention relates to a calking tool of that class to be used with a pneumatic hammer.

Many attempts have been made to supply tools for this purpose but in all with which I am acquainted either the weight of the device has been such that the force of the blows delivered on it have been largely absorbed by the mass of the tool; or the device has included provision for layering the oakum in the seam, which addition has not only increased the weight but the numerous attached parts will not maintain their fastening under the rapid vibration of the pneumatic hammer.

The device, which is the subject of this application, has been designed only as a calking tool, the layering of the oakum, which requires both judgment and experience being effected by a calker. This eliminates any complication of attached parts and reduces the weight.

The weight is further reduced to a minimum by the particular construction adopted.

This construction is fully set forth in the following specification, reference being made to the drawings by which it is accompanied, in which:

Figure 1 is a face view and part section on the line 1—1 in Fig. 2.

Fig. 2 is an edge view and part section on the line 2—2 in Fig. 1, and

Fig. 3 illustrates a modified form of disk hub.

In these drawings 2 is a disk wheel of suitable diameter, the cross section of which is adapted to fit the seam and drive the oakum home, for which purpose it may be grooved as drawn around its edge.

At its center this wheel has a substantially cylindrical machined hub 3 projecting from each side.

The stem 4 has a shouldered cylindrical portion to fit the socket of any standard pneumatic hammer, and below that cylindrical portion is bifurcated as at 6 to pass on each side of the disk wheel 2 and the ends of the bifurcation are machined to fit and form a bearing on the projecting bosses 3 of the disk wheel. Each bearing has an end housing 7 through which a pin 8 of relatively small size may be passed to maintain connection of the disk wheel and the stem, and to hold the bifurcated ends against any tendency to spread apart.

This pin 8 fits the aperture made for it in the end housing of each stem bearing but the aperture made for it in the hub of the disk is sufficiently free that the pin will not interfere with the full contact of the stem bearings on the hubs 3. Both the hub and pin will therefore be considerably smaller than what would be necessary, if, as is usually the case, the impact of the pneumatic hammer is designed to pass through the pin from the stem to the disk wheel.

It will be noticed that the friction of the stem bearings on the hubs does not interfere with free rotation of the disk, as between the rapid strokes of the hammer the elastic recoil on the stem will leave the disk free to turn on the smaller diameter of the pin 8.

By applying the bearings of the stem to the bosses of the wheel disk a considerable saving of weight is effected while maintaining the necessary strength, so that while the tool may be made strong enough to receive and impart the impulses of a pneumatic hammer, the weight of it will not absorb any considerable amount of the energy imparted and the wheel will roll along the seam as the material is calked in.

By giving a very slight conical taper inward to each boss, as shown in an exaggerated degree in Fig. 3, any tendency to spread the bifurcated ends 6 of the stem is prevented and a lighter pin 8 may be used.

The ends of the bosses may be slightly coned or convexly rounded, as shown, to lessen the frictional resistance to rotation.

Having now particularly described my invention, I hereby declare that what I claim as new and desire to be protected in by Letters Patent, is:

1. A calking tool, comprising in combination, a disk wheel, the edge of which is adapted to the requirements of the seam to be calked, said wheel having a central boss projecting from each side, a stem adapted at one end to receive the blows of a pneumatic hammer, and bifurcated at the opposite end to pass on each side of the disk wheel and bear on each hub of the wheel, each bearing of the stem being housed over the end of the hub, a pin through each housing of the stem and the wheel to connect the stem to the wheel, the fit of the pin in the wheel being sufficiently free to admit full bearing of the bifurcated ends of the stem on the hubs of the wheel.

2. A calking tool as set forth in claim 1, the fit of the stem bearings on the hubs of the wheel having provision preventing lateral spreading apart of the bifurcated ends of the stem.

3. A calking tool as set forth in claim 1, each hub of the disk wheel being slightly smaller in diameter toward the wheel to prevent lateral spreading apart of the bifurcated ends of the stem.

4. A calking tool as set forth in claim 1, the outer end of each wheel hub being convex where it contacts with the plane surface of the inner side of each housing of the stem bearing.

5. A calking tool comprising in combination, a disk wheel, the edge of which is adapted to the requirement of the seam to be calked, said wheel having a central hub projected from each side, a stem adapted at one end to receive the blows of a pneumatic hammer and bifurcated at the opposite end to pass on each side of the disk wheel and bear on each hub projection of the wheel.

In testimony whereof I affix my signature.

GUSTAVE O. SWANSON.